US010962561B2

(12) United States Patent
Lebron et al.

(10) Patent No.: US 10,962,561 B2
(45) Date of Patent: Mar. 30, 2021

(54) ISOLATING SENSOR ASSEMBLY USING ELASTIC MATERIAL

(71) Applicant: Honeywell International Inc., Morris Plains, NJ (US)

(72) Inventors: Pedro Luis Lebron, San Antonio, PR (US); Todd Loren Braman, New Brighton, MN (US); Steven Edward Peter, Blaine, MN (US); Christopher Jay Matthews, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 235 days.

(21) Appl. No.: 16/105,772

(22) Filed: Aug. 20, 2018

(65) Prior Publication Data

US 2020/0057088 A1 Feb. 20, 2020

(51) Int. Cl.
*G01P 1/02* (2006.01)
*G01P 1/00* (2006.01)

(52) U.S. Cl.
CPC ............... *G01P 1/02* (2013.01); *G01P 1/003* (2013.01); *G01P 1/026* (2013.01)

(58) Field of Classification Search
CPC . G01P 1/02; G01P 1/003; G01P 1/026; G01C 19/56
See application file for complete search history.

(56) References Cited

U.S. PATENT DOCUMENTS

| 5,731,541 | A  | * | 3/1998  | Bernd ................... B29C 31/045 |
|           |    |   |         | 174/358                              |
| 7,023,699 | B2 | * | 4/2006  | Glovatsky .......... H05K 7/20454     |
|           |    |   |         | 165/185                              |
| 8,116,101 | B2 |   | 2/2012  | Chang et al.                         |
| 8,354,587 | B2 | * | 1/2013  | Tappel ................... H05K 5/069  |
|           |    |   |         | 174/50.5                             |
| 8,931,765 | B2 |   | 1/2015  | Braman et al.                        |
| 9,625,284 | B2 |   | 3/2017  | Braman et al.                        |
| 9,772,343 | B2 |   | 9/2017  | Wang et al.                          |
| 2009/0007661 | A1 | * | 1/2009 | Nasiri ................ G01C 19/5769   |
|           |    |   |         | 73/504.03                            |
| 2010/0257932 | A1 | * | 10/2010 | Braman ................ G01C 21/16    |
|           |    |   |         | 73/493                               |

FOREIGN PATENT DOCUMENTS

| CN | 204594467 U | 8/2015 |
| CN | 204730844 U | 10/2015 |

* cited by examiner

*Primary Examiner* — David Z Huang
(74) *Attorney, Agent, or Firm* — Fogg & Powers LLC

(57) ABSTRACT

A sensor assembly is disclosed. The sensor assembly includes a housing that includes a top housing and a bottom housing that clamp together. The sensor assembly also includes a printed circuit board assembly (PBA). The sensor assembly also includes at least one piece of elastic material that is located in between the top housing and the PBA and in between the bottom housing and the PBA. When the PBA is clamped in the housing, the sensor assembly allows the PBA to maintain alignment relative to the housing across different environments in order to enable proper operation of the sensor assembly. A top surface of the PBA and a bottom surface of the PBA each have at least one three-dimensional feature that is designed to increase friction with the elastic material.

18 Claims, 8 Drawing Sheets

ISOLATING SENSOR ASSEMBLY USING ELASTIC MATERIAL

BACKGROUND

Sensor systems may be exposed to various kinetic, thermal, and/or electrical environments. These systems require some form of protection to function properly and minimize the risk of damage in these environments. Conventionally, an isolator may be used to reduce the energy the sensors get exposed to during these events, but such isolation systems come with their own disadvantages.

Specifically, vibration and shock isolation systems require space, and for many products, size limitation prevents them from incorporating an isolator (even though the product might benefit by using an isolator). This is especially true for, but not limited to, sensing, guidance, and navigation products (e.g., in aircraft, projectiles, trains, boats, cars, etc.) where sensors need to be adequately isolated from vibration and shock. However, size constraints often make the implementation of an isolation system into a product impractical or impossible.

Accordingly, it may be beneficial to create a sensor assembly that is adaptable to various kinetic, thermal, and/or electrical environments.

SUMMARY

A sensor assembly is disclosed. The sensor assembly includes a housing that includes a top housing and a bottom housing that clamp together. The sensor assembly also includes a printed circuit board assembly (PBA). The sensor assembly also includes at least one piece of elastic material that is located in between the top housing and the PBA and in between the bottom housing and the PBA. When the PBA is clamped in the housing, the sensor assembly allows the PBA to maintain alignment relative to the housing across different environments in order to enable proper operation of the sensor assembly. A top surface of the PBA and a bottom surface of the PBA each have at least one three-dimensional feature that is designed to increase friction with the elastic material.

A method for assembling a sensor assembly. The method includes placing a bottom elastic material in a bottom housing of the sensor assembly. The method also includes placing a PBA on top of the bottom elastic material. The method also includes placing a top elastic material in a top housing. The method also includes fastening the top housing to the bottom housing. When the PBA is clamped in the housing, the sensor assembly allows the PBA to maintain alignment relative to the housing across different environments in order to enable proper operation of the sensor assembly. A top surface of the PBA and a bottom surface of the PBA each have at least one three-dimensional feature that is designed to increase friction with the elastic material.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
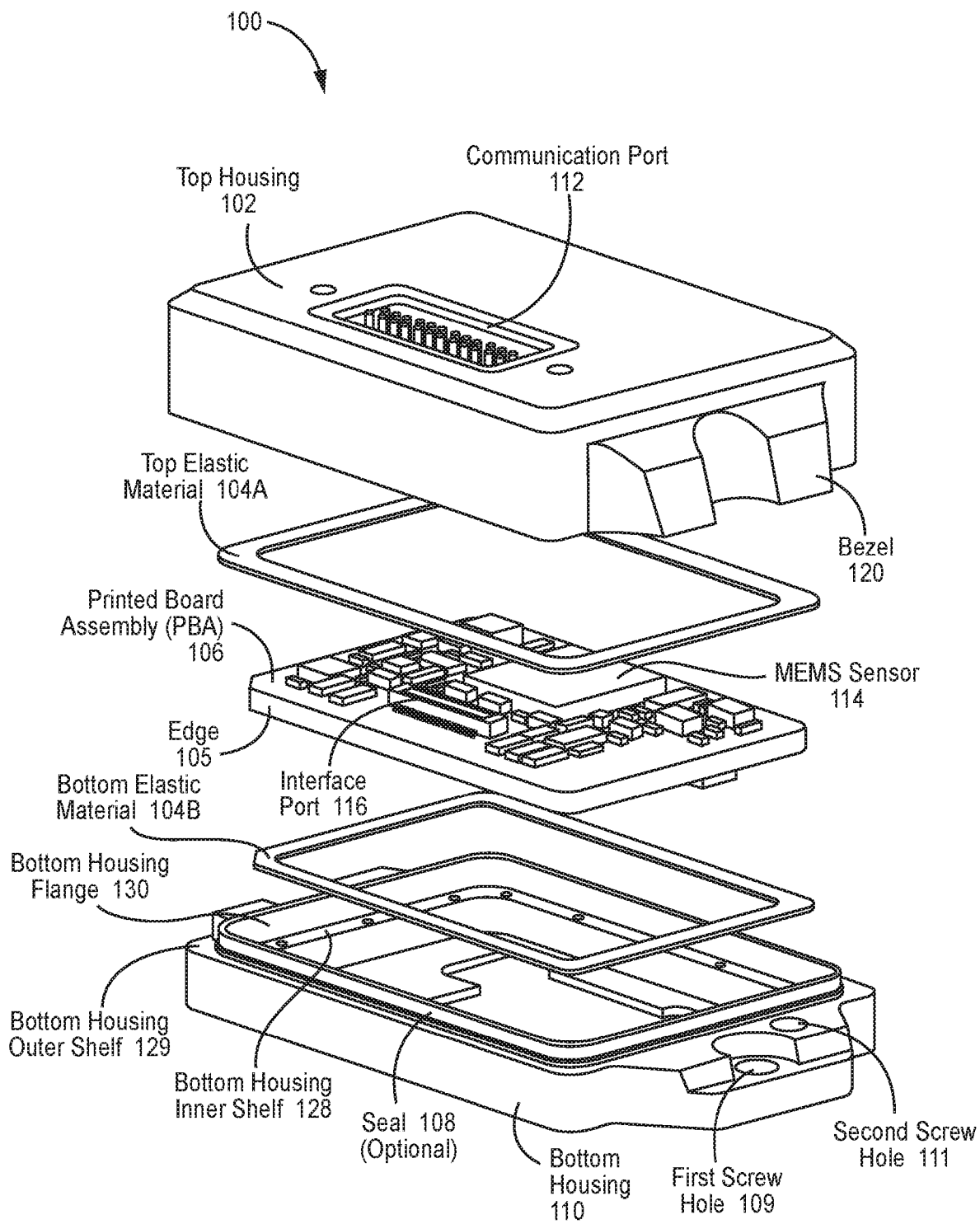
FIG. 1 is an exploded view of an example sensor assembly.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A sensor assembly is described herein. A printed board assembly (PBA), also referred to as a printed circuit board assembly, may be clamped in the sensor assembly by the housing it resides in (or any other part of the sensor assembly). Elastic material (e.g., silicone rubber) may be located on either side of the PBA to serve as cushions. Different elastic materials may be selected according to the type of material properties desired, e.g., kinetic isolation, thermal performance, and/or electrical conductivity desired for the sensor assembly.

In order to prevent the PBA from moving laterally under clamped condition during sustained acceleration, area(s) on the PBA and/or housing that will make contact with the elastic material may have one or more three-dimensional (3D) features. Without limitation, examples of 3D features include increased-surface roughness, machined geometries to increase static friction, bored hole(s), and solder cross-hatch or dot patterns (e.g., tied to copper ground planes). The 3D features may cause the elastic material to bite/grab onto said surfaces or features on the PBA and/or housing. Optionally, the elastic material may also be bonded, molded and/or wrapped around said surfaces.

Thermal pads are sometimes used to increase thermal conductivity, and they are typically employed strictly for thermal purposes. Rather than using thermal pads for heat transfer and a separate isolator for structural benefits, the present systems and methods may, in some configurations, combine them into a single part by using creative finishes and techniques to achieve adequate performance. By using the same elastic material as an isolator and a thermal conductor, the cost of sensor assemblies may be reduced.

Similarly, instead of using one type of material for electrical conductivity and a separate isolator for structural benefits, the present systems and methods may, in some configurations, use a single elastic material to achieve adequate performance. By using the same elastic material as an isolator and an electrical conductor, the cost of sensor assemblies may be reduced.

Other techniques for isolating a sensor within an assembly require molding rubber onto a metal substrate, and then fixing (directly or indirectly) the sensor to that substrate, then fixing (directly or indirectly) the substrate to the housing. However, the elastic material in the sensor assembly described herein is preferably not bonded onto the PBA or housing. Rather, the elastic material in this invention may be compressed onto (or wrapped around) the PBA and/or the housing with high friction due to the 3D features that bite/grab into the elastic material (or vice versa) (i.e., the elastic material flows into the small pockets created by the 3D features). Since the elastic material isn't permanently bonded or adhered, the sensor assembly described herein is adaptable to different environments based on the selection of the elastic material. Additionally, the sensor assembly described herein doesn't require the additional substrate.

For pedagogical purposes, the present systems and methods may be described in the context of an inertial measurement unit (IMU) assembly. However, any product that uses a PBA may benefit from the sensor assembly described herein. The sensor assembly may reduce overall product costs by eliminating the need for a separate vibration/shock isolation system and, instead, using elastic material compressed between high friction surfaces in its place. The sensor assembly described herein may also reduce overall product size, making the product more competitive/desirable.

FIG. 1 is an exploded view of an example sensor assembly 100. From top to bottom, the sensor assembly 100 generally includes at least a top housing 102, a top elastic material 104A, a printed board assembly (PBA) 106, a bottom elastic material 104B, and a bottom housing 110. Together, the top housing 102 and the bottom housing 110 may be referred to simply as a housing. It should be noted that the naming conventions of "top" and "bottom" are used herein for convenience, but are arbitrary since the sensor assembly 100 may be installed in any suitable orientation.

The PBA 106 may be a circuit board that mechanically supports and/or electrically connects various chips (e.g., integrated circuit(s) in a plastic housing) and/or discrete components (e.g., resistors, capacitors, inductors, etc.) fixed on the board. The PBA 106 may be multi-layered with one or more conductive layers and one or more non-conductive layers. Additionally, the PBA 106 may include one or more pads, ports, electrically-coupling solder deposits, conductive traces, vias, through-holes between layers, superficial printed characters, etc.

Without limitation, the PBA 106 may optionally include one or more micro-electro-mechanical systems (MEMS) sensors 114. The MEMS sensor(s) 114 may each include one or more accelerometers and/or gyroscopes. For example, the MEMS sensor(s) 114 can be part of an inertial measurement unit (IMU), which includes three accelerometers that aid in measuring acceleration along three orthogonal axes, and three gyroscopes that provide measurements of rotation about three orthogonal axes. In addition to the MEMS sensor 114, various other supporting components may be located on the top surface and/or the bottom surface of the PBA 106.

The sensor assembly 100 may be configured to support and position the printed board assembly (PBA) 106 inside the housing, i.e., the PBA 106 may be clamped in a cavity formed between the top housing 102 and the bottom housing 110. The top elastic material 104A and the bottom elastic material 104B may be compressed onto the perimeter of the top surface and the bottom surface of the PBA 106, respectively, to isolate the PBA 106 from vibration/shock, conduct thermal energy away from the PBA 106, and/or conduct electrical charge to or away from the PBA 106, e.g., the bottom elastic material 104B may ground the PBA 106.

Specifically, the PBA 106 may be seated on a bottom housing inner shelf 128, cushioned by the bottom elastic material 104B, i.e., the bottom elastic material 104B may be located between the PBA 106 and the bottom housing inner shelf 128. Since it is cushioned by the bottom elastic material 104B, the bottom surface of the PBA 106 preferably does not directly contact the bottom housing 110. In this way, the bottom elastic material 104B may isolate the PBA 106 from vibration or shock events transferred through the bottom housing 110, transfer thermal energy from the PBA 106 to the bottom housing 110, and/or conduct electric charge between the PBA 106 and the bottom housing 110. While seated on the bottom housing inner shelf 128, the edge 105 of the PBA 106 may be surrounded by a bottom housing flange 130.

Similarly, a top elastic material 104A may be located between the PBA 106 and the top housing 102 (in the assembled sensor assembly 100) such that the top surface of the PBA 106 preferably does not directly contact the top housing 102. Therefore, the top elastic material 104A may act as a cushion around the perimeter of the top surface of the PBA 106. In this way, the top elastic material 104A may isolate the PBA 106 from vibration or shock events transferred through the top housing 102, transfer thermal energy from the PBA 106 to the top housing 102, and/or conduct electrical charge between the PBA 106 and the top housing 102.

The top elastic material 104A and the bottom elastic material 104B may be any material that generally reverts to an original shape and/or position following deformation, e.g., silicone rubber injection molded under high temperature and pressure, a thermal pad, or other elastomer. The top elastic material 104A and the bottom elastic material 104B may be the same material or different material.

The type of material used for the top elastic material 104A and the bottom elastic material 104B may depend on the desired properties given the intended application of the sensor assembly 100. In other words, the top elastic material 104A and the bottom elastic material 104B may be selected based on the material properties needed to meet structural, thermal, and/or electrical requirements. For example, a first type of elastic material 104 may protect the PBA 106 from physical damage caused by clamping force, and it may also provide vibration and shock isolation/attenuation. Alternatively or additionally, a second type of elastic material 104 with increased thermal conductivity (e.g., a thermal pad) may be used if thermal conductivity is desired. Alternatively or additionally, a third type of elastic material 104 with increased electrical conductivity may be used, e.g., for improved grounding or electromagnetic interference performance.

Furthermore, while illustrated and described as having a two-piece elastic material (i.e., a top elastic material 104A and a separate bottom elastic material 104B), the sensor assembly 100 may alternatively use a different configuration of elastic material 104 to isolate the PBA 106 from vibration and/or shock, transfer thermal energy away from the PBA 106 and/or conduct electrical charge to or away from the PBA 106. For example, a single, continuous C-channel of elastic material 104 may wrap around the perimeter of the top surface and bottom surface of the PBA 106, as well as the edge 105 of the PBA 106. Alternatively, more than two pieces of elastic material 104 may be used to accomplish similar functionality. Furthermore, while the elastic material 104 is preferably not bonded, molded, or chemically adhered to the PBA 106, top housing 102, or bottom housing 110, such configurations are possible. The elastic material 104 may be a custom designed or standard geometry, and may have multiple layers (top, bottom, in-between, etc.) or a single layer.

The top housing 102 and the bottom housing 110 may be made of the same or different material, e.g., carbon fiber, aluminum, other metal/alloy, etc. The type of material, and/or specific dimensions used for the top housing 102 and the bottom housing 110 may be selected based on the desired properties, e.g., weight, thermal conductivity, electrical conductivity, surface friction, etc.

The top housing 102 may include a communication port 112 that is communicatively coupled to an interface port 116 on the PBA 106, thereby enabling an exterior system (i.e., exterior to the sensor assembly 100) to communicate with the PBA 106. For example, an exterior processor (e.g., in a vehicle or projectile) may receive measurements and/or calculations (via the interface port 116 and the communication port 112) relating to acceleration mid-flight.

The size and shape of the top housing 102 may correspond to the size and shape of the bottom housing 110 to create a tight fit. Specifically, a top housing flange (i.e., a flange protruding from the sides the top housing 102, which can be seen in later figures) may rest on top of a bottom housing outer shelf 129 (when the sensor assembly 100 is assembled). When the top housing 102 and the bottom housing 110 are fastened together, an optional seal 108 may reside in the cavity bounded by (1) the interior surface of the top housing flange; and (2) the exterior surface of the bottom housing flange 130. The option seal 108 may form a moisture barrier between the interior of the sensor assembly 100 and the external environment, i.e., to prevent moisture from seeping into the sensor assembly 100. The top housing 102 may be fastened to the bottom housing 110 by threading a screw or bolt through one or more second screw holes 111 in the bottom housing 110 and into a corresponding hole (not visible in FIG. 1) extending partially into the bezel 120 of the top housing 102.

Maintaining PBA 106 alignment relative to the housing across different environments (e.g. vibration, shock, etc.) may prevent operational disruption of the sensor assembly 100, i.e., since the sensor assembly 100 may be particularly sensitive to displacement of the PBA 106 relative to the top housing 102 and the bottom housing 110. When the top housing 102 is fastened to the bottom housing 110, the top elastic material 104A, the PBA 106, and the bottom elastic material 104B may be compressed together and clamped into place in the interior of the sensor assembly 100. In order to prevent PBA 106 slippage relative to the housing (e.g., during acceleration of the sensor assembly 100), one or more 3D features may be present on the PBA 106, the top housing 102, and/or the bottom housing 110 where contact is made with the elastic material 104. The position of the PBA 106 relative to the top housing 102 and the bottom housing 110 may be approximately maintained because the elastic material 104 may stretch (e.g., during acceleration) and temporarily displace the PBA 106 relative to the top housing 102 and the bottom housing 110, but may quickly revert and bring the PBA 106 back to the approximate original position.

As used herein, the term "3D feature" refers any alteration to a surface that increases the contact friction of that surface, e.g., that increases contact friction of the surface with the top elastic material 104A or the bottom elastic material 104B. The 3D features may include one or more features raised from a surface, e.g., deposit(s) of solder (e.g., in a crosshatch, dot, or other geometrical pattern) onto a surface and/or other protrusions from a surface, etc. Alternatively, or additionally, the 3D features may include one or more features formed by removing material from a surface, e.g., one or more holes bored into a surface, a machine finish to a surface (e.g., etched or milled grooves into a surface), etc.

In one configuration, one or more deposits of solder used to implement a 3D feature are purely mechanical in purpose and do not serve any electrical purpose, i.e., the deposits do not electrically couple different components or ground the PBA 106. Alternatively or additionally, one or more deposits of solder used to implement a 3D feature may be used to ground the PBA 106, e.g., one or more vias and/or electrical traces that electrically couple the PBA 106 to a common ground plane). Furthermore, any solder patterns used to implement a 3D feature may be deposited during manufacture, specified on PBA 106 drawings, and, where appropriate, connections to a ground plane may be specified in manufacturing files.

The 3D feature(s) may generally be located on areas of the PBA 106, the top housing 102, and/or the bottom housing 110 that physically contact the top elastic material 104A or the bottom elastic material 104B. Specifically, 3D features may be located on the perimeter of the top surface of the PBA 106; the perimeter of the bottom surface of the PBA 106; the inner surface of the top housing 102; and/or the inner surface of the bottom housing 110 (e.g., the bottom housing inner shelf 128). Furthermore, the 3D features need not be limited to only the perimeter of the PBA 106, e.g., the 3D features could be located near the center of a circular PBA 106.

During acceleration (or other shock/vibration) of the sensor assembly 100, the top elastic material 104A may grip, or grab onto, the 3D feature(s) on the top surface of the PBA 106 and/or the 3D feature(s) on the inner surface of the top housing 102. Similarly, during acceleration (or other shock/vibration) of the sensor assembly 100, the bottom elastic material 104b may grip, or grab onto, the 3D features on the bottom surface of the PBA 106 and/or the 3D feature(s) on the surface of the bottom housing 110 (e.g., the 3D feature(s) on the bottom housing inner shelf 128). Therefore, even if the elastic material 104 stretches during acceleration, vibration, or shock, the elastic material 104 may revert to its approximate original position relatively quickly, thereby returning the PBA 106 to its approximate original position relative to the top housing 102 and bottom housing 110. Furthermore, the top elastic material 104A and the bottom elastic material 104B may attenuate high-frequency energy that the PBA 106 is exposed to.

It should be noted that the sensor assembly 100 may (1) position the PBA 106 in the housing; (2) isolate the PBA 106 from vibration and/or shock; (3) conduct thermal energy away from the PBA 106; and/or (4) conduct electrical charge to or away from the PBA 106; preferably without using chemical adhesives or complicated/time-consuming manufacturing techniques to bond elastic material to the PBA 106.

The sensor assembly 100 may be used for sensing, guidance, and/or navigation applications, e.g., to measure acceleration. For example, the sensor assembly 100 may be attached to an aircraft, projectile, train, boat, car, etc. The sensor assembly 100 may be fastened to a vehicle, projectile, or other device by threading one or more bolts or screws through one or more first screw holes 109 in the bottom housing 110 and partially into a corresponding hole on the vehicle, projectile, or other device.

The sensor assembly 100 may provide several advantages compared to other techniques for positioning and isolating a sensor from vibration. First, the thickness and specific elastic material 104 can be chosen based on the material properties needed to meet structural, thermal, and/or electrical requirements, e.g., thermal, electrical, shock/vibration dampening, etc. Therefore, the sensor assembly 100 may be adaptable to different environments based on the selection of the elastic material 104. Second, the manufacturing (and any necessary replacement) of the elastic material 104 may be inexpensive and/or quicker than other solutions because the elastic material 104 is preferably not bonded or otherwise adhered to the PBA 106 or housing (other than by friction created by the 3D features). Third, other techniques of bonding or adhering cushioning material to a surface may not be compatible with PBAs 106, so cushioning material is bonded to a substrate, then the PBA 106 to the substrate. The sensor assembly 100 described herein does not require a substrate separate from the PBA 106 in order to position and isolate the PBA 106.

Figure 2:
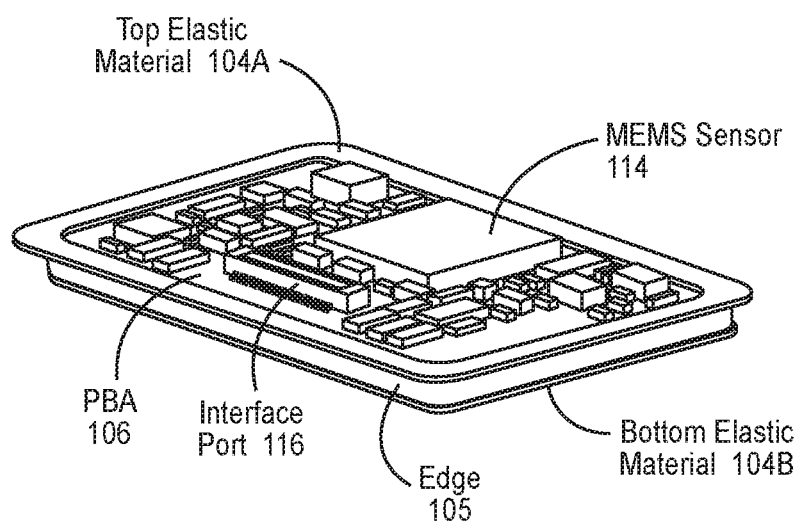
FIG. 2 is a perspective view of a top elastic material compressed onto a top surface of a printed board assembly (PBA) and a bottom elastic material compressed onto a bottom surface of the PBA.

FIG. 2 is a perspective view of a top elastic material 104A compressed onto a top surface of a printed board assembly (PBA) 106 and a bottom elastic material 104B compressed onto a bottom surface of the PBA 106.

The top surface of the PBA 106 may include a MEMS sensor 114, e.g., that implements an inertial measurement unit (IMU) with a single axis of freedom, 3-degrees of freedom (3-DOF), 6-degrees of freedom (6-DOF), or 9-degrees of freedom (9-DOF). The PBA 106 may also include an interface port 116 that is communicatively coupled to a communication port 112 on the top housing 102. The PBA 106 may also include other supporting components on the top and/or bottom surface of the PBA 106.

In one configuration, the top elastic material 104A and the bottom elastic material 104B are sized to cover the perimeter of the top surface and the bottom surface of the PBA 106, respectively, but not the interior of the top surface or the bottom surface of the PBA 106. Therefore, each of the top elastic material 104A and the bottom elastic material 104B may be a sheet of elastic material that is roughly the same shape as the footprint of the PBA 106 with a hole in the middle, i.e., so as not to cover the circuitry on the interior of the top surface or the bottom surface of the PBA 106.

Additionally or alternatively, the PBA 106 may be clamped into a housing at the center and/or the perimeter of the PBA 106, e.g., using one or more bosses or other feature that makes contact with elastic material sandwiched between the PBA 106 and the boss feature. Center clamping may be particularly advantageous in circular-shaped (or near-circular-shaped) PBAs 106, but is not limited to those shapes. For example, the rectangular PBA 106 illustrated in the Figures may be clamped in the interior (assuming there is room in the interior of the PBA 106) instead of, or in addition to, clamping around the edges of the PBA 106. In configurations where the PBA 106 is clamped in or near the interior of the PBA 106, the elastic material may cover portions of the interior of the PBA 106, e.g., where the PBA 106 is clamped.

Furthermore, the top elastic material 104A and the bottom elastic material 104B may be different sizes. Specifically, the top elastic material 104A may have slightly larger dimensions than the top surface of PBA 106, while the bottom elastic material 104B may have approximately the same dimensions as the bottom surface of the PBA 106, although other configurations are possible. Accordingly, when the top elastic material 104A is compressed onto the top surface of the PBA 106, the top elastic material 104A may extend beyond the top surface of the PBA 106, e.g., the top elastic material 104A may overlap the perimeter of the top surface of the PBA 106 and cover at least a portion of the bottom housing flange 130. In contrast, when the bottom elastic material 104B is compressed onto the bottom surface of the PBA 106, the bottom elastic material 104A may not extend (or not extend very far) beyond the bottom surface of the PBA 106. For example, the bottom elastic material 104B may have a footprint no larger than the bottom housing inner shelf 128, and the bottom surface of the PBA 106 may not directly contact the bottom housing 110 when the PBA 106 is seated in the bottom housing 110 (and cushioned by the bottom elastic material 104B).

In an alternative configuration, a single piece of elastic material 104 (with a C-channel cross-section) may wrap around the perimeter of the top and bottom surfaces of the PBA 106, as well as the edge 105 of the PBA 106

Figure 3:
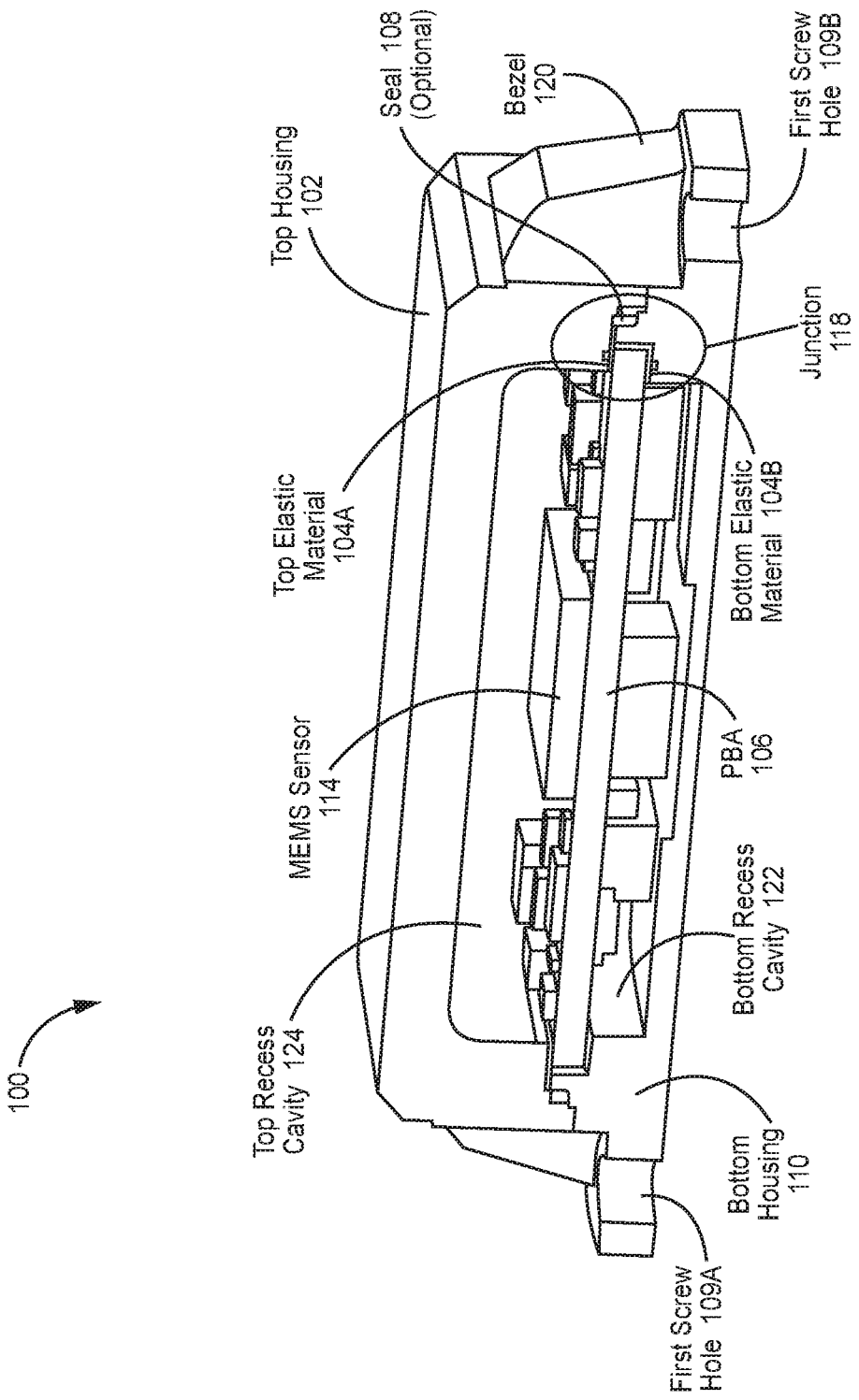
FIG. 3 is a cross-sectional view of an assembled sensor assembly.

FIG. 3 is a cross-sectional view of an assembled sensor assembly 100. The sensor assembly 100 may be attached to a vehicle, projectile, or other device. For example, the sensor assembly 100 may be fastened to a vehicle, projectile, or other device by threading one or more bolts or screws through one or more first screw holes 109A-B in the bottom housing 110. The sensor assembly 100 may be used to measure acceleration of the vehicle or projectile to which it is attached, e.g., using one or more MEMS sensors 114.

The top housing 102 may be fastened to the bottom housing 110 by threading a screw or bolt through one or more second screw holes 111 in the bottom housing 110 and into corresponding holes in the bezel 120 of the top housing 102. When the top housing 102 is fastened to the bottom housing 110, the PBA 106 may be clamped in a cavity formed between the top housing 102 and the bottom housing 110. A top recess cavity 124 may exist between the PBA 106 and the top housing 102, while a bottom recess cavity may exist between the PBA 106 and the bottom housing 110.

The PBA 106 may be cushioned by the bottom elastic material 104B around the perimeter of the bottom surface of the PBA 106 such that the bottom surface of the PBA 106 preferably does not directly contact the bottom housing 110. The bottom elastic material 104B may isolate the PBA 106 from vibration or shock events transferred through the bottom housing 110, transfer thermal energy from the PBA 106 to the bottom housing 110, and/or conduct electrical charge between the PBA 106 and the bottom housing 110.

Similarly, the PBA 106 may be cushioned by the top elastic material 104A around the perimeter of the top surface of the PBA 106 such that the top surface of the PBA 106 does not directly contact the top housing 102. The top elastic material 104A may isolate the PBA 106 from vibration or shock events transferred through the top housing 102, transfer thermal energy from the PBA 106 to the top housing 102, and/or conduct electrical charge between the PBA 106 and the top housing 102.

When the top housing 102 and the bottom housing 110 are fastened together, the top housing 102, the top elastic material 104A, the PBA 106, the bottom elastic material 104B, and the bottom housing 110 may all converge at a junction 118 that extends along the perimeter of the PBA 106. Specific examples of how the relevant components are situated relative to one another in the junction 118 are described in FIGS. 4A-4D below. When the top housing 102 and the bottom housing 110 are fastened together, an optional seal 108 may reside in the cavity bounded by (1) the interior surface of the top housing flange; and (2) the exterior surface of the bottom housing flange 130.

As described above, the PBA 106, the top housing 102, and/or the bottom housing 110 may include 3D features where they contact the elastic material 104 in the junction 118. The 3D features may include one or more deposits of solder (e.g., in a crosshatch, dot, or other geometrical pattern) onto a surface, one or more holes bored into a surface, a machine finish to a surface (e.g., etched or milled grooves into a surface), and/or other protrusions from a surface, etc.

The elastic material 104 may grip, or grab onto, the 3D features, thereby allowing the PBA 106 to maintain alignment relative to the top housing 102 and bottom housing 110. For example, the elastic material 104 may stretch (e.g., during acceleration) and temporarily displace the PBA 106 relative to the top housing 102 and/or the bottom housing 110, but may quickly revert and bring the PBA 106 back to the approximate original position relative to the top housing 102 and bottom housing 110 (also referred to as "zero position"). Furthermore, the top elastic material 104A and the bottom elastic material 104B may attenuate high-frequency energy that the PBA 106 is exposed to.

FIGS. 4A-D are cross-sectional views of example junctions 118 in an assembled sensor assembly 100. The junction 118 may be the area of the sensor assembly 100 where the top housing 102, the top elastic material 104A, the PBA 106, the bottom elastic material 104B, and the bottom housing 110 generally converge.

The top housing 102 may be fastened to the bottom housing 110 by threading a screw or bolt through one or more second screw holes 111 in the bottom housing 110 and into one or more corresponding holes in the bezel 120 of the top housing 102. When the top housing 102 is fastened to the bottom housing 110, the PBA 106 may be clamped between the top housing 102 and the bottom housing 110. A top recess cavity 124 may exist between the PBA 106 and the top housing 102, while a bottom recess cavity may exist between the PBA 106 and the bottom housing 110.

When the top housing 102 and the bottom housing 110 are fastened together, a top housing flange 132 may rest on the bottom housing outer shelf 129, preferably without any cushion. The top housing flange 132 may protrude from the bottom of the top housing 102, e.g., from the outer-most portion of the bottom of the side walls.

Additionally, an inner shelf of the top housing 102 may also rest on top of a bottom housing flange 130, i.e., the inner shelf is at least the portion of the top housing 102 that is directly above the top elastic material 104A in FIGS. 4A-4D. The bottom housing flange 130 may be a protrusion from the bottom housing 110, e.g., the bottom housing flange 130 may be located between the bottom housing inner shelf 128 and the bottom housing outer shelf 129. The top elastic material 104A may serve as a cushion between the inner shelf of the top housing 102 and the bottom housing flange 130, e.g., in FIGS. 4A-4C. Alternatively, there may not be any elastic material 104 located between the inner shelf of the top housing 102 and the bottom housing flange 130, e.g., in FIG. 4D.

An optional seal 108 may reside in the cavity formed between the bottom housing flange 130 and the top housing flange 132. The optional seal 108 may create a moisture-resistant barrier between the interior of the sensor assembly 100 and the exterior of the sensor assembly 100.

Figure 4A:
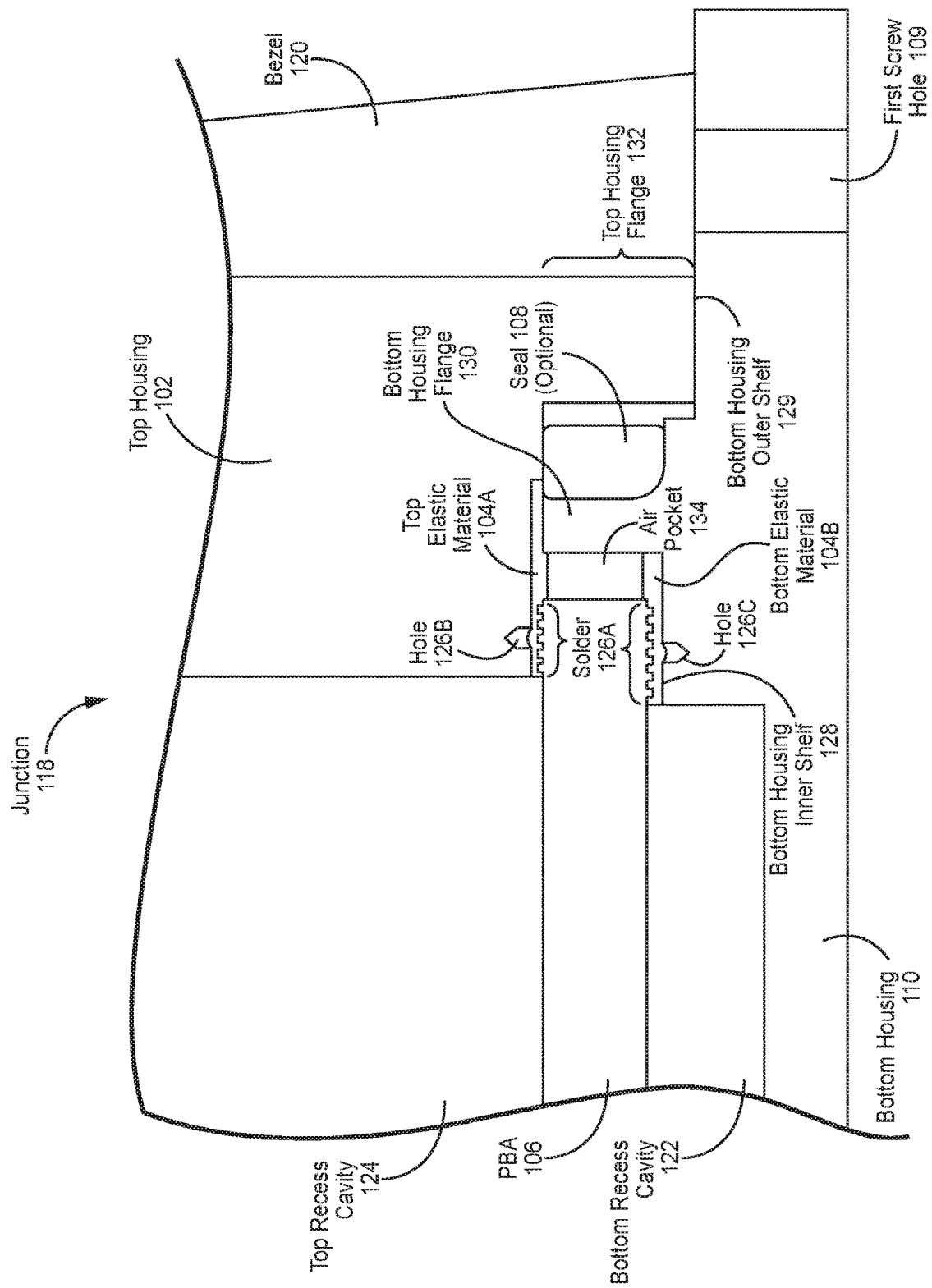
FIGS. 4A-D are cross-sectional views of example junctions in an assembled sensor assembly.
Figure 4B:
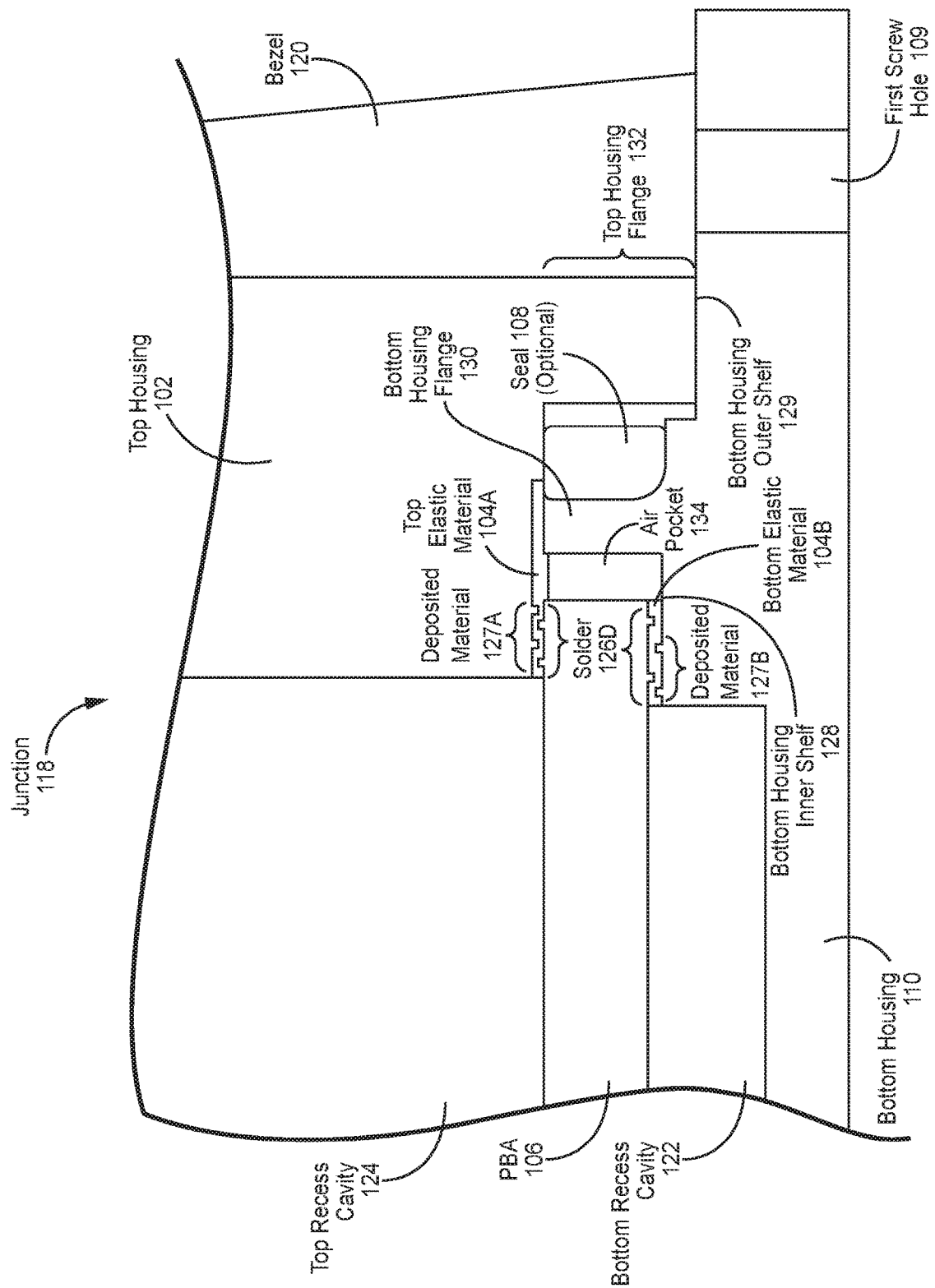
Figure 4C:
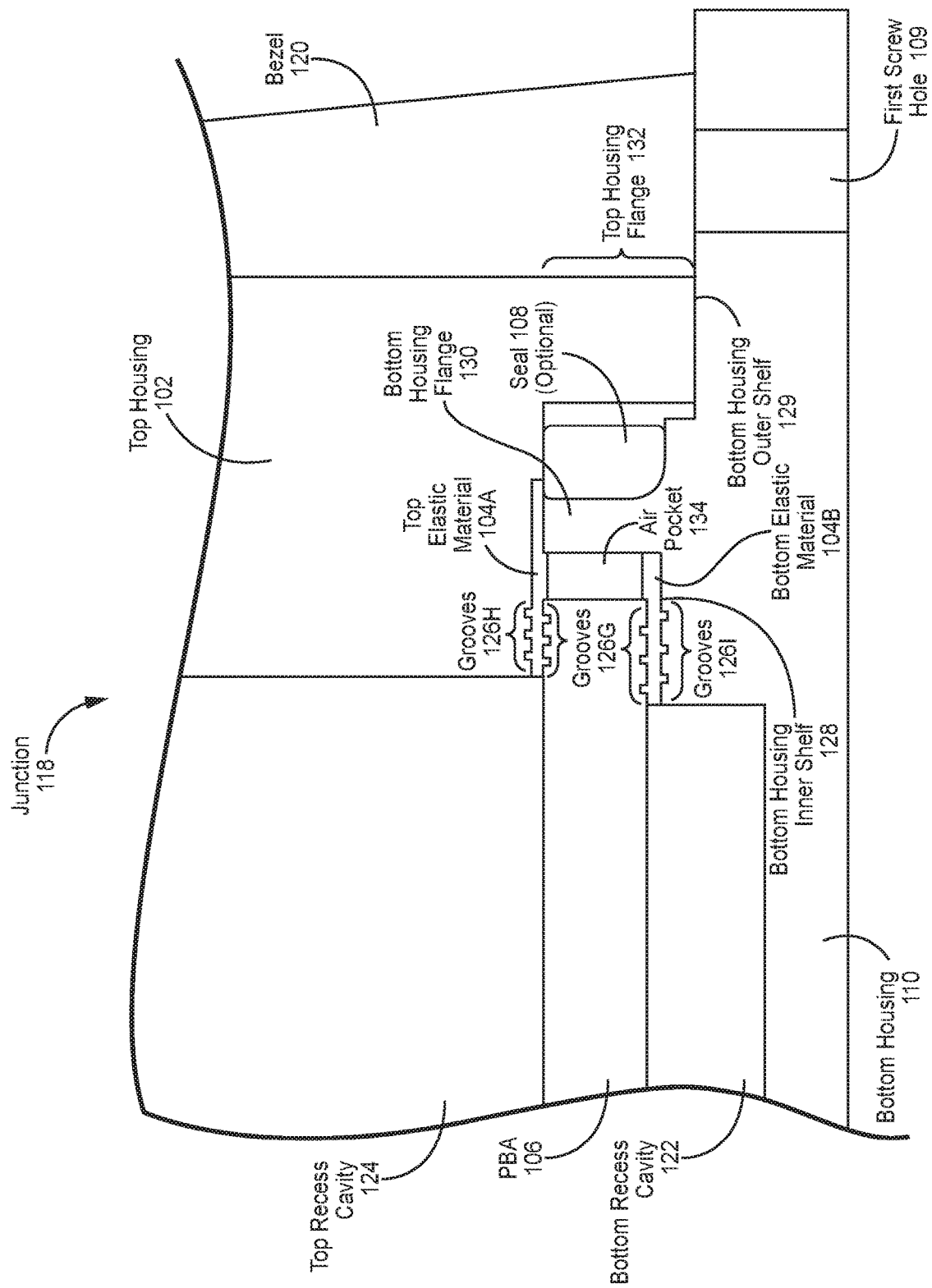

The bottom elastic material 104B may be placed in between the bottom housing inner shelf 128 and the PBA 106. In a first configuration, the bottom elastic material 104B may have approximately the same footprint as the bottom housing inner shelf 128, e.g., as illustrated in FIGS. 4A and 4C. In the first configuration, the bottom elastic material 104B may extend beyond the PBA 106, i.e., if the PBA 106 does not fill the entire bottom housing inner shelf 128, an air pocket 134 may exist between the edge 105 of the PBA 106 and the bottom housing flange 130. In a second configuration, the bottom elastic material 104B may have a smaller footprint than the bottom housing inner shelf 128, e.g., as illustrated in FIG. 4B. In either configuration, the bottom elastic material 104 should extend across the entire portion of the PBA 106 that rests on the bottom housing inner shelf 128, i.e., the PBA 106 preferably does not contact the bottom housing inner shelf 128 (or any other portion of the bottom housing 110) directly.

The top elastic material 104A may be placed in between the top housing 102 and the PBA 106. The top elastic material 104B may extend beyond the PBA 106, bridge the air pocket 134, and at least partially cover the top of the bottom housing flange 130, e.g., as illustrated in FIGS. 4A-4C. In other words, neither the PBA 106 nor the bottom housing flange 130 preferably contacts the top housing 102 directly in the first configuration.

Figure 4D:
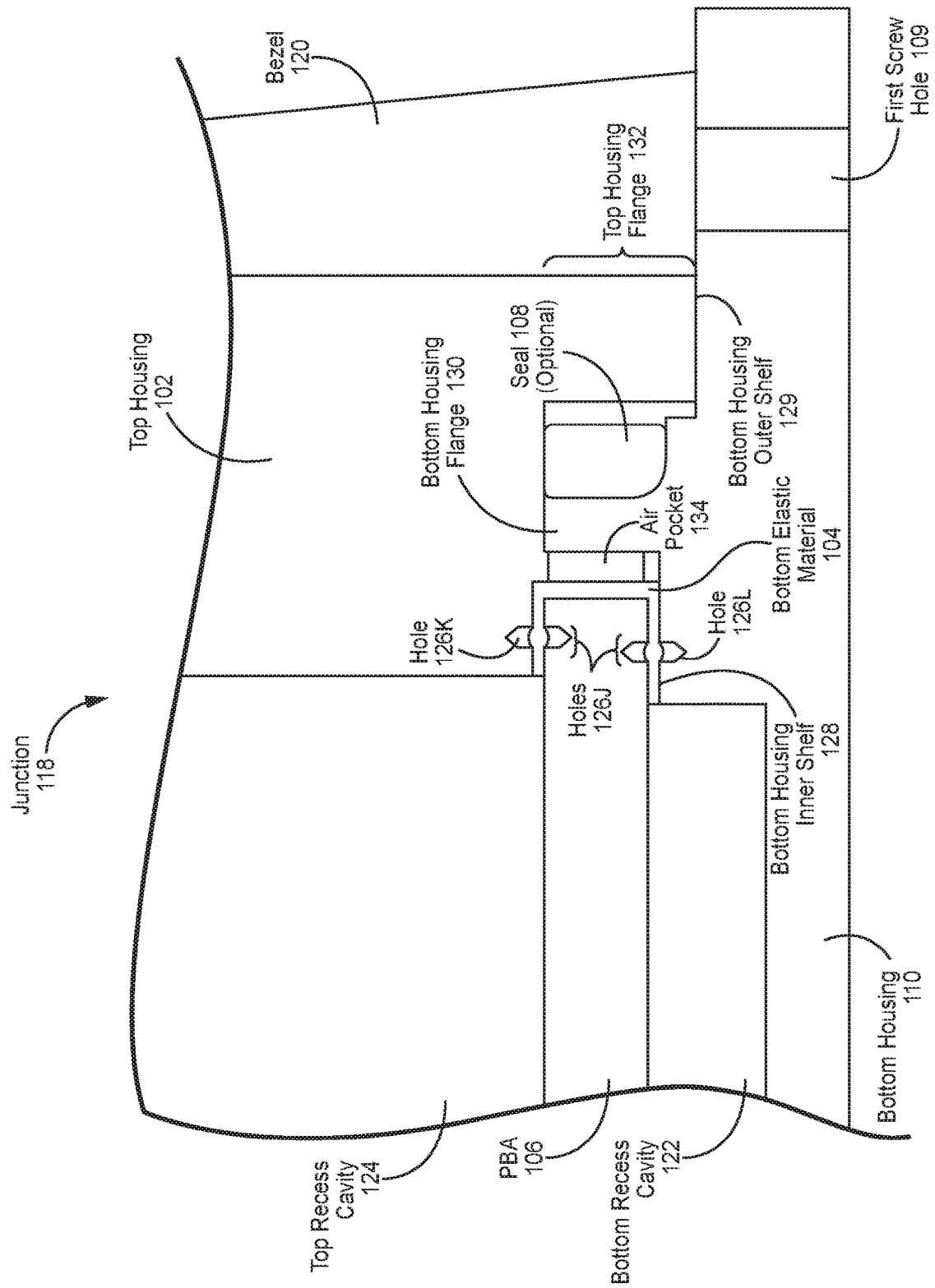

Instead of using a separate top elastic material 104A and bottom elastic material 104B, the elastic material 104 may be a single, continuous C-channel that wraps around the perimeter of the top and bottom surfaces of the PBA 106, as well as the edge 105 of the PBA 106, e.g., as illustrated in FIG. 4D. In the C-channel configuration, the elastic material 104 may not cover the top of the bottom housing flange 130, i.e., the top housing 102 may contact the bottom housing flange 130 directly. In the C-channel configuration, the elastic material 104 may also not cover the entire bottom housing inner shelf 128.

FIGS. 4A-4D also illustrate specific examples of 3D features 126A-L that may be present on the PBA 106, the top housing 102, and/or the bottom housing 110. In FIG. 4A, the 3D features 126A on the PBA 106 may be deposits of solder 126A. The solder deposits 126A may be mechanical in nature, while not serving any electrical purpose, i.e., the solder deposits 126A do not electrically couple different components or ground the PBA 106. Alternatively, one or more of the solder deposits 126A may be used to electrically couple the PBA 106 to a common ground plane (not shown). The solder deposits 126A may be arranged in a crosshatch, dot, or other geometrical pattern on the perimeter of the top and bottom surfaces of the PBA 106.

Additionally, the 3D features 126B-C on the top housing 102 and the bottom housing 110 may be holes 126B-C bored into the top housing 102 and the bottom housing 110, respectively. While a single bored hole 126B is illustrated in the inner shelf of the top housing 102, more than one hole 126B may be bored into the top housing 102. Similarly, while a single bored hole 126C is illustrated in the bottom housing inner shelf 128, more than one hole 126C may be bored into the bottom housing inner shelf 128.

When the top housing 102 and the bottom housing 110 are fastened together, the top elastic material 104A may grab, or bite onto, the three dimensional features 126A-B on either side of it, i.e., the top elastic material 104A may at least partially fill the gaps in the solder 126A (on the top surface of the PBA 106) and the hole 126B in the inner shelf of the top housing 102. Similarly, when the top housing 102 and the bottom housing 110 are fastened together, the bottom elastic material 104B may grab, or bite onto, the three dimensional features 126A, 126C on either side of it, i.e., the bottom elastic material 104B may at least partially fill the gaps in the solder 126A (on the bottom surface of the PBA 106) and the hole 126C in the bottom housing inner shelf 128.

During shock, vibration, and/or acceleration, the PBA 106 may be slightly displaced temporarily as the top elastic material 104A and/or the bottom elastic material 104B stretch. Due to the sensitivity of the MEMS sensor 114, even small displacements relative to the top housing 102 and/or bottom housing 110 may greatly disrupt measurements/calculations from the sensor assembly 100, e.g., that are used by sensing, guidance, and navigation applications. However, since the elastic material 104 grabs, or bites onto, the various 3D features 126A-C, the elastic material 104 may revert to its approximate original position relatively quickly, thereby returning the PBA 106 to its approximate original position relative to the top housing 102 and bottom housing 110.

In FIG. 4B, the 3D features 126D on the PBA 106 are also deposits of solder 126D. Additionally, deposits of material 127A-B (e.g., other than solder) may be located on the inner shelf of the top housing 102 and the bottom housing inner shelf 128, respectively. The solder deposits 126D and/or deposits of other material 127A-B may be arranged in a crosshatch, dot, or other geometrical pattern on the perimeter of the top and bottom surfaces of the PBA 106. Additionally, the solder deposits 126D and/or deposits of other material 127A-B may be purely mechanical in function or used to electrically couple the PBA 106 to a common ground plane.

When the top housing 102 and the bottom housing 110 are fastened together, the top elastic material 104A may grab, or bite onto, the solder deposits 126D and deposits of other material 127A on either side of it, i.e., the top elastic material 104A may at least partially fill the gaps in the solder 126D (on the top surface of the PBA 106) and the gaps in the deposited material 127A on the inner shelf of the top housing 102. Similarly, when the top housing 102 and the bottom housing 110 are fastened together, the bottom elastic material 104B may grab, or bite onto, the solder deposits 126D and deposits of other material 127B on either side of it, i.e., the bottom elastic material 104B may at least partially fill the gaps in the solder 126D (on the bottom surface of the PBA 106) and the gaps in the deposited material 127B on the bottom housing inner shelf 128. The elastic material 104 may stretch during acceleration, vibration, or shock of the sensor assembly 100 and displace the PBA 106 relative to the housing in order to attenuate high-frequency energy that the PBA 106 is exposed to. However, since the elastic material 104 grabs, or bites onto, the solder deposits 126D and deposits of other material 127A-B, the elastic material 104 may revert to its approximate original position relatively quickly following stretching, thereby returning the PBA 106 to its approximate original position relative to the top housing 102 and bottom housing 110.

It should also be noted that the bottom elastic material 104B may not cover the entire bottom housing inner shelf 128. However, the bottom elastic material 104B may preferably be large enough to cushion the PBA 106 and prevent the PBA 106 from directly contacting the bottom housing inner shelf 128.

In FIG. 4C, the 3D features 126G-I may be grooves 126G-I in the surfaces of the PBA 106, the inner shelf of the top housing 102, and the bottom housing inner shelf 128, respectively. Therefore, unlike solder deposits, the grooves 126G-I may be small recesses in (rather than protrusions extending from) the surfaces of the PBA 106, the top housing 102, and the bottom housing 110, respectively.

The grooves 126G-I may be arranged in a geometrical pattern and may be formed using any suitable etching, milling, or similar technique. Alternatively, instead of a pattern of grooves 126G-I, the 3D features 126G-I may be patterns of holes bored into the surface of the PBA 106, the inner shelf of the top housing 102, and the bottom housing inner shelf 128.

When the top housing 102 and the bottom housing 110 are fastened together, the top elastic material 104A may grab, or bite onto, the three dimensional features 126G-H on either side of it, i.e., the top elastic material 104A may at least partially fill the grooves 126G-I in the top surface of the PBA 106 and the inner shelf of the top housing 102. Similarly, when the top housing 102 and the bottom housing 110 are fastened together, the bottom elastic material 104B may grab, or bite onto, the three dimensional features 126G, 126I on either side of it, i.e., the bottom elastic material 104B may at least partially fill the grooves 126G, 126I in the bottom surface of the PBA 106 and the bottom housing inner shelf 128. The elastic material 104 may stretch during acceleration, vibration, or shock of the sensor assembly 100 and displace the PBA 106 relative to the housing in order to attenuate high-frequency energy that the PBA 106 is exposed to. However, since the elastic material 104 grabs, or bites onto, the various 3D features 126G-I, the elastic material 104 may revert to its approximate original position relatively quickly following stretching, thereby returning the PBA 106 to its approximate original position relative to the top housing 102 and bottom housing 110.

In FIG. 4D, the 3D features 126J-L may be one or more holes 126J-L bored in the surfaces of the PBA 106, the inner shelf of the top housing 102, and the bottom housing inner shelf 128, respectively. Additionally, as mentioned above, the elastic material 104 in FIG. 4D may be a single, continuous C-channel that wraps around the perimeter of the top and bottom surfaces of the PBA 106, as well as the edge 105 of the PBA 106. In the configuration of FIG. 4D, the elastic material 104 may not cover the top of the bottom housing flange 130 or the entire bottom housing inner shelf 128.

When the top housing 102 and the bottom housing 110 are fastened together, the elastic material 104 may grab, or bite onto, the three dimensional features 126J-L on either side of it. Specifically, the top elastic material 104A may at least partially fill the holes 126J-K in the top surface of the PBA 106 and the inner shelf of the top housing 102. Similarly, the bottom elastic material 104B may at least partially fill the holes 126J, 126L in the bottom surface of the PBA 106 and the bottom housing inner shelf 128. The elastic material 104 may stretch during acceleration, vibration, or shock of the sensor assembly 100 and displace the PBA 106 relative to the housing in order to attenuate high-frequency energy that the PBA 106 is exposed to. However, since the elastic material 104 grabs, or bites onto, the various 3D features 126J-L, the elastic material 104 may revert to its approximate original position relatively quickly following stretching, thereby returning the PBA 106 to its approximate original position relative to the top housing 102 and bottom housing 110.

Any mixture of 3D features 126 described in FIGS. 4A-4D may be combined in a single sensor assembly 100. Furthermore, the 3D features 126 on the top surface of the PBA 106 may be different than the 3D features 126 on the bottom surface of the PBA 106, e.g., the 3D features 126 on the top surface may be solder deposits while the 3D features 126 on the bottom surface may be etched or milled grooves, etc. Similarly, the 3D features 126 on the inner shelf of the top housing 102 need not be the same as the 3D features 126 on the bottom housing inner shelf 128, e.g., the 3D features 126 on the inner shelf of the top housing 102 may be one or more bored holes, while the 3D features 126 on the bottom housing inner shelf 128 may be solder deposits. Furthermore, if a geometrical pattern of solder deposits 126 is used on the top surface and the bottom surface of the PBA 106, the pattern used on the top surface need not be the same used on the bottom surface, e.g., a crosshatch pattern may be used on the top surface, while a dot pattern may be used on the bottom surface.

While not specifically illustrated in FIGS. 4A-4D, the 3D features 126 may be a non-solder protrusion from the PBA 106, the top housing 102, and/or the bottom housing 110.

For example, the PBA 106 may include one or more plastic protrusions on the perimeter of the top and/or bottom surface that the elastic material 104 can grab onto. Additionally, or alternatively, "dummy" component(s) (e.g., resistor(s), capacitor(s), etc.) may be soldered on to the PBA to serve as 3D features 126, i.e., the dummy components may grab onto the elastic material, but serve no circuit-like function. Additionally, or alternatively, component(s) (e.g., resistor(s), capacitor(s), etc.) that serve circuit-like function(s) may be soldered on to the PBA and may serve as 3D features 126. Similarly, the top housing 102 and/or the bottom housing may include metal (or carbon fiber) protrusions that the elastic material 104 can grab onto.

Figure 5:
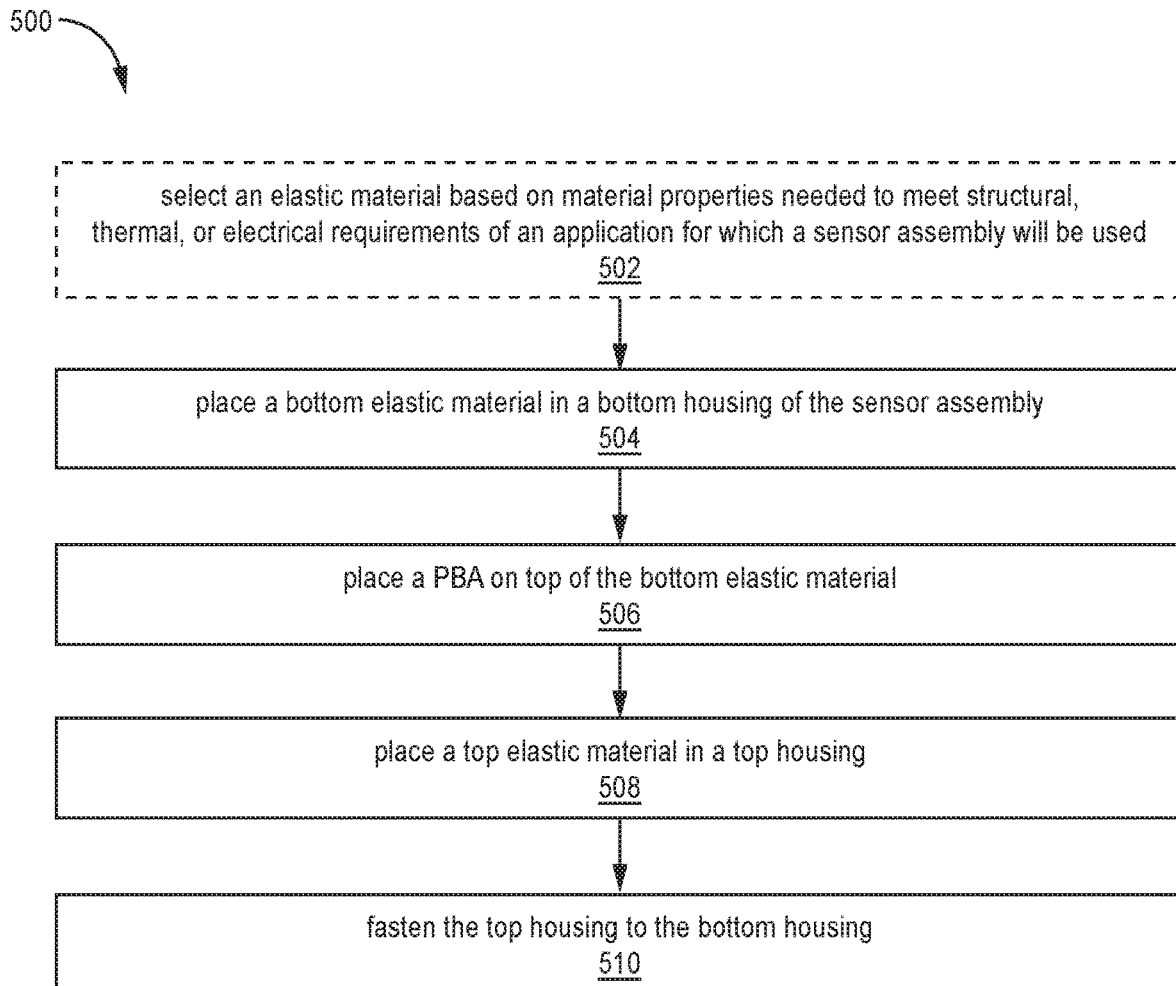
FIG. 5 is a flow diagram illustrating a method for assembling a sensor assembly.

FIG. 5 is a flow diagram illustrating a method 500 for assembling a sensor assembly 100. The method 500 may be performed by a technician during manufacture, installation, repair, and/or maintenance of the sensor assembly 100.

Optionally, an elastic material may be selected 502 based on material properties needed to meet structural, thermal, or electrical requirements of an application for which a sensor assembly 100 will be used. For example, a first type of elastic material may protect the PBA 106 from physical damage caused by the clamping force, and it may also provide vibration and shock isolation/attenuation. Alternatively or additionally, a second type of elastic material with increased thermal conductivity (e.g., a thermal pad) may be used if thermal conductivity is desired. Alternatively or additionally, a third type of elastic material 104 with increased electrical conductivity may be used, e.g., for improved grounding or electromagnetic interference performance.

A bottom elastic material 104B may be placed 504 in a bottom housing 110 of the sensor assembly 100, e.g., the bottom elastic material 104B may be placed on a bottom housing inner shelf 128. The bottom elastic material 104B may preferably have a footprint no larger than the bottom housing inner shelf 128.

A PBA 106 may be placed 506 on top of the bottom elastic material 104B, e.g., such that the bottom surface of the PBA 106 may preferably not directly contact the bottom housing 110 when the PBA 106 is seated in the bottom housing 110 (since the bottom surface of the PBA 106 is cushioned by the bottom elastic material 104B). In other words, the bottom elastic material 104B may be located in between the bottom housing 110 and the PBA 106.

A top elastic material 104A may be placed 508 in a top housing 102, e.g., on an inner shelf of the top housing 102. Alternatively, instead of placing the top elastic material 104 in the top housing 102, the top elastic material 104A may be placed on top surface of the PBA 106, e.g., which has already been placed on top of the bottom elastic material 104B in the bottom housing 110.

The top housing 102 and the bottom housing 110 may be fastened 510 together, e.g., by threading a screw or bolt through one or more second screw holes 111 in the bottom housing 110 and into a corresponding hole extending partially into the bezel 120 of the top housing 102. Following fastening, the top elastic material 104A may be located in between the top housing 102 and the PBA 106.

When the top housing 102 and the bottom housing 110 are fastened together, the elastic material 104 may grab, or bite onto, 3D features 126 on the PBA 106, the top housing 102, and/or the bottom housing 110. Therefore, the 3D features may increase friction with the elastic material 104. Specifically, the top elastic material 104A may grab, or bite onto, the 3D features 126 on the PBA 106 and the inner surface of the top housing 102, and the bottom elastic material 104B may grab, or bite onto, the 3D features on the PBA 106 and the bottom housing inner shelf 128.

The 3D features 126 may include one or more deposits of solder (e.g., in a crosshatch, dot, or other geometrical pattern) onto a surface, one or more holes bored into a surface, a machine finish to a surface (e.g., etched or milled grooves into a surface), and/or other protrusions from a surface, etc.

The elastic material 104 may stretch during acceleration, vibration, or shock of the sensor assembly 100 and displace the PBA 106 relative to the housing in order to attenuate high-frequency energy that the PBA 106 is exposed to. However, since the elastic material 104 grabs, or bites onto, the various 3D features 126, the elastic material 104 may revert to its approximate original position relatively quickly following stretching, thereby returning the PBA 106 to its approximate original position relative to the top housing 102 and bottom housing 110.

Terminology

Brief definitions of terms, abbreviations, and phrases used throughout this application are given below.

The term "determining" may include calculating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, circuitry, or firmware (or any combination thereof) component. Modules are typically functional components that can generate useful data or other output using specified input(s). A module may or may not be self-contained. An application program (also called an "application") may include one or more modules, or a module can include one or more application programs.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

In conclusion, the present disclosure provides novel systems, methods, and arrangements for an isolating sensor assembly using elastic material. While detailed descriptions of one or more configurations of the disclosure have been given above, various alternatives, modifications, and equivalents will be apparent to those skilled in the art without departing from its essential characteristics. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting since the scope of the invention is indicated by the appended claims.

EXAMPLE EMBODIMENTS

Example 1 includes a sensor assembly, comprising: a housing comprising a top housing and a bottom housing that clamp together; a printed circuit board assembly (PBA); and at least one piece of elastic material that is located in between the top housing and the PBA and in between the bottom housing and the PBA, wherein, when the PBA is clamped in the housing, the sensor assembly allows the PBA to maintain alignment relative to the housing across different environments in order to enable proper operation of the sensor assembly, wherein a top surface of the PBA and a bottom surface of the PBA each have at least one three-dimensional feature that is designed to increase friction with the elastic material.

Example 2 includes the sensor assembly of Example 1, wherein the three-dimensional features comprise one or more of: at least one deposit of solder that serves no electrical purpose; at least one deposit of solder that electrically connects the PBA to a ground plane; at least one component that is located on the top surface of the PBA or the bottom surface of the PBA; at least one component that is embedded in the PBA; at least one hole bored into at least one of the outer surfaces of the PBA; machined surfaces; and protrusions from the housing or the PBA.

Example 3 includes the sensor assembly of Example 2, wherein the deposits of solder are arranged in a crosshatch pattern, a dot pattern, or other geometrical pattern.

Example 4 includes the sensor assembly of any of Examples 1-3, wherein an inner surface of the top housing and an inner surface of the bottom housing have three-dimensional features that are designed to increase friction with the elastic material.

Example 5 includes the sensor assembly of Example 4, wherein when the top housing and the bottom housing are fastened together, the elastic material grabs the three dimensional features on the PBA, the inner surface of the top housing, and the inner surface of the bottom housing.

Example 6 includes the sensor assembly of Example 5, wherein during acceleration, vibration, or shock of the sensor assembly, and the elastic material stretches and displaces the PBA relative to the housing to attenuate high-frequency energy that the PBA is exposed to.

Example 7 includes the sensor assembly of Example 6, wherein the elastic material reverts to an approximate original position following the stretching, thereby returning the PBA to its approximate original position relative to the housing.

Example 8 includes the sensor assembly of any of Examples 1-7, wherein the elastic material is removable from the sensor assembly.

Example 9 includes the sensor assembly of any of Examples 1-8, wherein the elastic material is selected based on based on material properties needed to meet structural, thermal, or electrical requirements of an application for which the sensor assembly will be used.

Example 10 includes the sensor assembly of any of Examples 1-9, wherein the PBA includes at least one micro-electro-mechanical systems (MEMS) sensor that implements an inertial measurement unit (IMU) with a single axis of freedom, 3-degrees of freedom (3-DOF), 6-degrees of freedom (6-DOF), or 9-degrees of freedom (9-DOF).

Example 11 includes a method for assembling a sensor assembly, comprising: placing a bottom elastic material in a bottom housing of the sensor assembly; placing a PBA on top of the bottom elastic material; placing a top elastic material in a top housing; and fastening the top housing to the bottom housing, wherein, when the PBA is clamped in the housing, the sensor assembly allows the PBA to maintain alignment relative to the housing across different environments in order to enable proper operation of the sensor assembly, wherein a top surface of the PBA and a bottom surface of the PBA each have at least one three-dimensional feature that is designed to increase friction with the elastic material.

Example 12 includes the method of Example 11, wherein the three-dimensional features comprise one or more of: at least one deposit of solder that serves no electrical purpose; at least one deposit of solder that electrically connects the PBA to a ground plane; at least one component that is located on the top surface of the PBA or the bottom surface of the PBA; at least one component that is embedded in the PBA; at least one hole bored into at least one of the outer surfaces of the PBA; machined surfaces; and protrusions from the housing or the PBA.

Example 13 includes the method of Example 12, wherein the deposits of solder are arranged in a crosshatch pattern, a dot pattern, or other geometrical pattern.

Example 14 includes the method of any of Examples 11-13, wherein an inner surface of the top housing and an inner surface of the bottom housing have three-dimensional features that are designed to increase friction with the top elastic material and the bottom elastic material.

Example 15 includes the method of Example 14, wherein when the top housing and the bottom housing are fastened together, the top elastic material grabs the three dimensional features on the PBA and the inner surface of the top housing, and the bottom elastic material grabs the three dimensional features on the PBA and the inner surface of the bottom housing.

Example 16 includes the method of Example 15, wherein during acceleration, vibration, or shock of the sensor assembly, and the elastic material stretches and displaces the PBA relative to the housing to attenuate high-frequency energy that the PBA is exposed to.

Example 17 includes the method of Example 16, wherein the elastic material reverts to an approximate original position following the stretching, thereby returning the PBA to its approximate original position relative to the housing.

Example 18 includes the method of any of Examples 11-17, further comprising removing and replacing at least one of the top elastic material and the bottom elastic material in the sensor assembly.

Example 19 includes the method of any of Examples 11-18, further comprising selecting the top elastic material and the bottom elastic material based on based on material properties needed to meet structural, thermal, or electrical requirements of an application for which the sensor assembly will be used.

Example 20 includes the method of any of Examples 11-19, wherein the PBA includes at least one micro-electro-mechanical systems (MEMS) sensor that implements an inertial measurement unit (IMU) with a single axis of freedom, 3-degrees of freedom (3-DOF), 6-degrees of freedom (6-DOF), or 9-degrees of freedom (9-DOF).

What is claimed is:

1. A sensor assembly, comprising:
   a housing comprising a top housing and a bottom housing that clamp together;
   a printed circuit board assembly (PBA); and
   at least one piece of elastic material that is located in between the top housing and the PBA and in between the bottom housing and the PBA,
   wherein, when the PBA is clamped in the housing, the sensor assembly allows the PBA to maintain alignment relative to the housing across different environments in order to enable proper operation of the sensor assembly,
   wherein a top surface of the PBA and a bottom surface of the PBA each have at least one three-dimensional feature that is designed to increase friction with the elastic material,
   wherein one or more of the three-dimensional features comprise at least one deposit of solder arranged in a crosshatch pattern, a dot pattern, or other geometrical pattern, wherein the one or more three-dimensional features protrude from one of the surfaces of the PBA and bites onto the elastic material, each protruding three-dimensional feature serving no electrical purpose.

2. The sensor assembly of claim 1, wherein the three-dimensional features comprise one or more of:
   at least one hole bored into at least one of the outer surfaces of the PBA;
   machined surfaces; and
   protrusions from the housing or the PBA.

3. The sensor assembly of claim 1, wherein an inner surface of the top housing and an inner surface of the bottom housing have three-dimensional features that are designed to increase friction with the elastic material.

4. The sensor assembly of claim 3, wherein when the top housing and the bottom housing are fastened together, the elastic material grabs the three dimensional features on the PBA, the inner surface of the top housing, and the inner surface of the bottom housing.

5. The sensor assembly of claim 4, wherein during acceleration, vibration, or shock of the sensor assembly, the elastic material stretches and displaces the PBA relative to the housing to attenuate high-frequency energy that the PBA is exposed to.

6. The sensor assembly of claim 5, wherein the elastic material reverts to an approximate original position following the stretching, thereby returning the PBA to its approximate original position relative to the housing.

7. The sensor assembly of claim 1, wherein the elastic material is removable from the sensor assembly.

8. The sensor assembly of claim 1, wherein the elastic material is selected based on material properties needed to meet structural, thermal, or electrical requirements of an application for which the sensor assembly will be used.

9. The sensor assembly of claim 1, wherein the PBA includes at least one micro-electro-mechanical systems (MEMS) sensor that implements an inertial measurement unit (IMU) with a single axis of freedom, 3-degrees of freedom (3-DOF), 6-degrees of freedom (6-DOF), or 9-degrees of freedom (9-DOF).

10. A method for assembling a sensor assembly, comprising:
    placing a bottom elastic material in a bottom housing of the sensor assembly;
    placing a printed circuit board assembly (PBA) on top of the bottom elastic material;
    placing a top elastic material in a top housing; and
    fastening the top housing to the bottom housing, wherein, when the PBA is clamped in the housing, the sensor assembly allows the PBA to maintain alignment relative to the housing across different environments in order to enable proper operation of the sensor assembly,
    wherein a top surface of the PBA and a bottom surface of the PBA each have at least one three-dimensional feature that is designed to increase friction with the elastic material,
    wherein one or more of the three-dimensional features comprise at least one deposit of solder arranged in a crosshatch pattern, a dot pattern, or other geometrical pattern, wherein the one or more three-dimensional features protrude from one of the surfaces of the PBA and bites onto the elastic material, each protruding three-dimensional feature serving no electrical purpose.

11. The method of claim 10, wherein the three-dimensional features comprise one or more of:
    at least one hole bored into at least one of the outer surfaces of the PBA;
    machined surfaces; and
    protrusions from the housing or the PBA.

12. The method of claim 10, wherein an inner surface of the top housing and an inner surface of the bottom housing have three-dimensional features that are designed to increase friction with the top elastic material and the bottom elastic material.

13. The method of claim 12, wherein when the top housing and the bottom housing are fastened together, the top elastic material grabs the three dimensional features on the PBA and the inner surface of the top housing, and the bottom elastic material grabs the three dimensional features on the PBA and the inner surface of the bottom housing.

14. The method of claim 13, wherein during acceleration, vibration, or shock of the sensor assembly, the elastic material stretches and displaces the PBA relative to the housing to attenuate high-frequency energy that the PBA is exposed to.

15. The method of claim 14, wherein the elastic material reverts to an approximate original position following the stretching, thereby returning the PBA to its approximate original position relative to the housing.

16. The method of claim 10, further comprising removing and replacing at least one of the top elastic material and the bottom elastic material in the sensor assembly.

17. The method of claim 10, further comprising selecting the top elastic material and the bottom elastic material based on material properties needed to meet structural, thermal, or electrical requirements of an application for which the sensor assembly will be used.

18. The method of claim 10, wherein the PBA includes at least one micro- electro-mechanical systems (MEMS) sensor that implements an inertial measurement unit (IMU) with a single axis of freedom, 3-degrees of freedom (3-DOF), 6-degrees of freedom (6-DOF), or 9-degrees of freedom (9-DOF).

* * * * *